H. D. CHURCH.
MOTOR VEHICLE RADIATOR.
APPLICATION FILED DEC. 6, 1912.
1,314,788.
Patented Sept. 2, 1919.
2 SHEETS—SHEET 1.
Fig. 1.
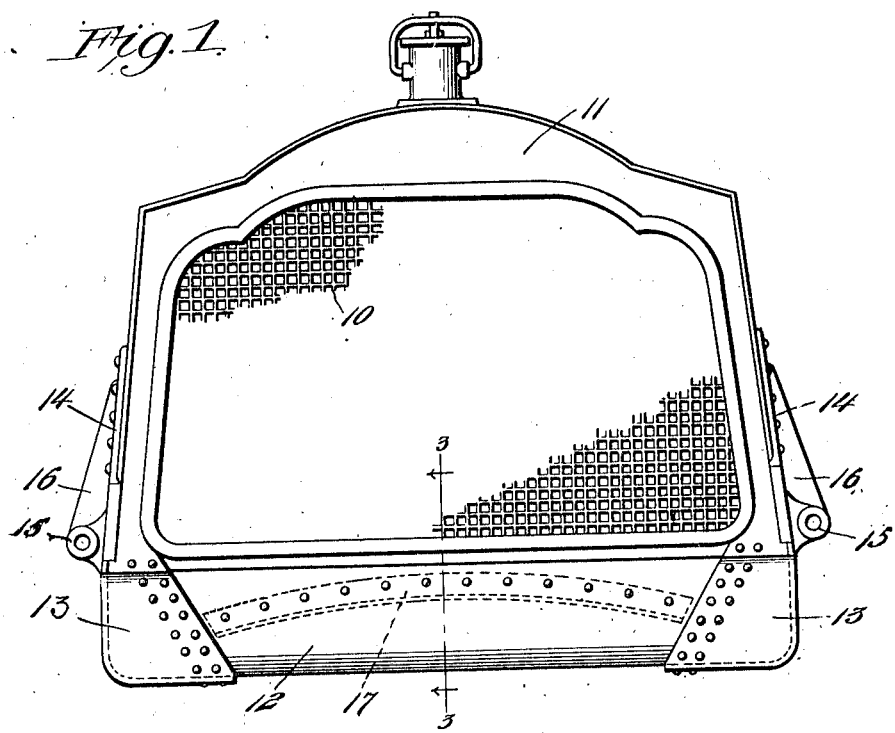
Fig. 2.
Fig. 3.
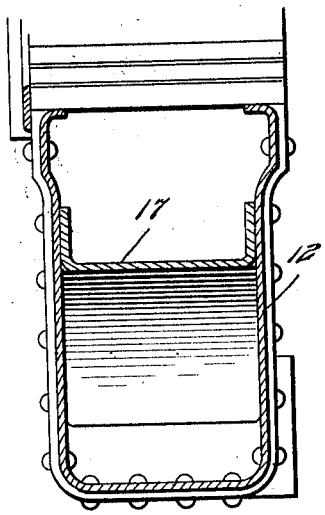
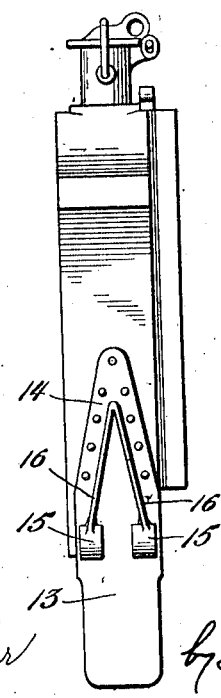
Witnesses
Hubert M. Spangler
B. M. Kent
Inventor
Harold D. Church
by Foster Freeman Watson & Coit,
Attorneys

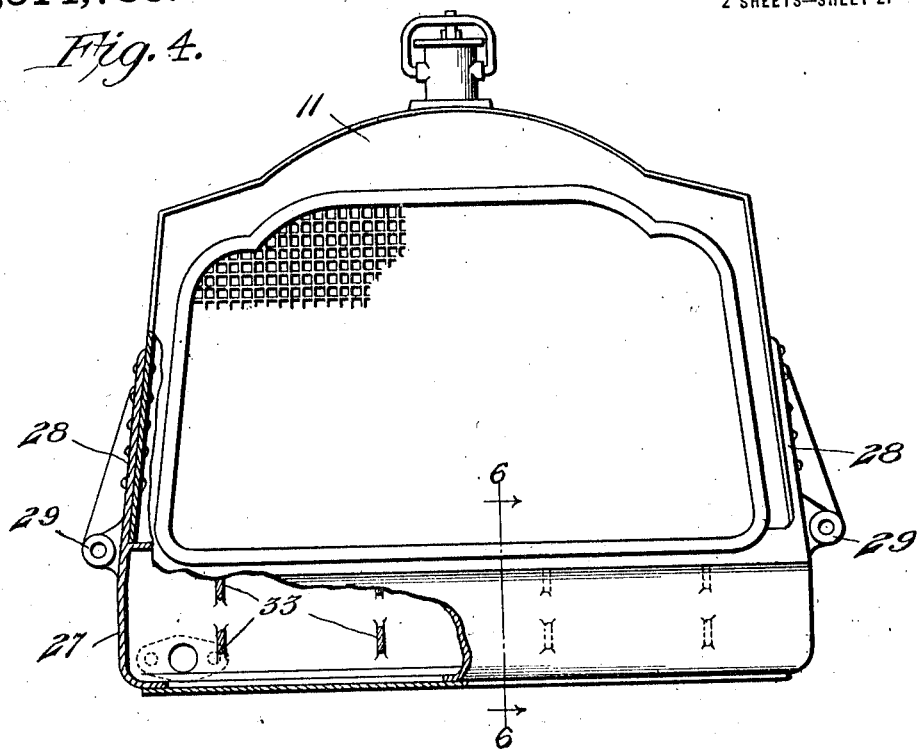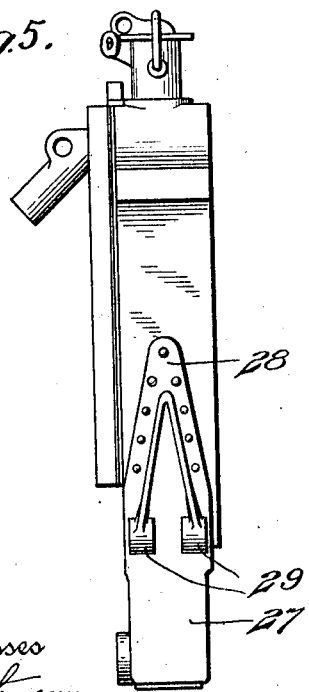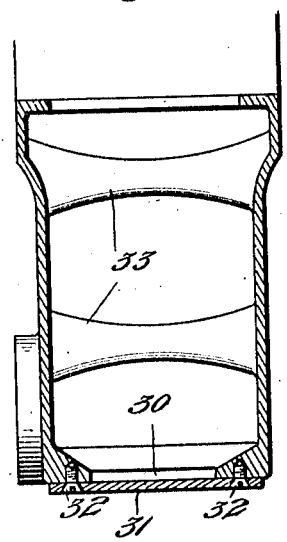

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE RADIATOR.

1,314,788.  Specification of Letters Patent.  Patented Sept. 2, 1919.

Application filed December 6, 1912. Serial No. 735,343.

*To all whom it may concern:*

Be it known that I, HAROLD D. CHURCH, a citizen of the United States, residing at Detroit, Wayne county, State of Michigan, have invented certain new and useful Improvements in Motor-Vehicle Radiators, of which the following is a specification.

This invention relates to motor vehicles and more particularly to improvements in the construction of the radiator.

One of the objects of the invention is to provide a more rigid and substantial connection between the lower tank of the radiator and the upper casing.

Another object is to provide a reinforced lower tank in which the front and rear sides are connected together and so reinforced as to strengthen the tank as a beam for supporting the load which it carries.

Other objects and the features of novelty will be apparent from the following description taken in connection with the accompanying drawings, in which:

Figure 1 is a front elevation of a radiator embodying the features of my invention.

Fig. 2 is a side elevation of the same.

Fig. 3 is an enlarged transverse section of the lower tank on the line 3—3 of Fig. 1.

Fig. 4 is a front elevation of a radiator embodying another form of my invention, certain parts being broken away.

Fig. 5 is a side elevation of the radiator shown in Fig. 4.

Fig. 6 is an enlarged transverse section on the line 6—6 of Fig. 4.

Referring to the drawings, and more particularly to Figs. 1 to 3; it will be seen that the radiator comprises the usual radiating section 10 which is inclosed at its sides and top by an inverted U-shaped casing, the upper portion 11 of which constitutes the usual receiving tank or chamber which receives the cooling water from the motor of the vehicle and distributes the same to the radiating section 10. Below the radiating section is the usual lower tank 12 which receives the cooled water from the radiating section and from which the water is returned to the motor for the purpose of cooling the latter.

As illustrated in Figs. 1 and 3 the lower tank is made from sheet metal and is U-shaped in cross section and has its ends riveted to the castings 13, these castings being provided with the upwardly extending arms 14 which are inwardly inclined and riveted to the sides of the casing. The arms 14 are also provided with supporting lugs 15 which are suitably braced by means of the webs 16 and which are adapted to be connected with any suitable means for supporting the radiator on the vehicle frame.

When in use the tank 12 is usually filled with water and the weight of this water and the shocks which result therefrom, due to the vibration of the radiator as the vehicle travels over the roads, subjects the tank to comparatively excessive bending strains. From Fig. 1 it will be observed that the tank constitutes a beam supported at its ends, and in order to strengthen the tank as a beam to enable it to withstand the shocks to which it is subjected, I connect the front and rear sides together by means of a channel member 17 which is arranged within the tank and riveted to the walls thereof. This channel member is arched to give additional strength and, as will be readily understood, ties the front and rear wall of the tank together in such a manner as to prevent buckling thereof due to the load to which the tank is subjected. The channel member 17 extends substantially the full length of the tank 12 and therefore reinforces the tank throughout its entire length, the end castings 13 being sufficiently rigid to withstand the shocks without reinforcement.

Referring to Figs. 4 to 6 it will be seen that the invention may also be embodied in a construction in which the lower tank is in the form of an integral casting 27 having the upwardly projecting arms 28 and the supporting lugs 29, the arms 28 being secured to the sides of the casing in the same manner as the arms 14 shown in Fig. 1. When the construction shown in Fig. 4 is employed the lower side of the tank 27 is preferably provided with an opening 30, which opening is closed by a suitable cover plate 31 secured to the tank in any suitable manner as by means of screws 32.

Arranged on the interior of the tank are the reinforcements 33, preferably arranged at suitable intervals throughout the length of the tank and connecting the front and rear walls thereof for the purpose of reinforcing these walls. The reinforcements 33 are substantially equivalent to the channel member 17 shown in Figs. 1 and 3.

I have illustrated and described what I now consider to be the preferred embodiments of my invention, but it will be obvious to those skilled in the art that various changes may be made in the minor details of construction, within the scope of the appended claims, and therefore I do not wish to be limited to the exact details shown and described.

Having thus described the invention what is claimed as new is:

1. A radiator for motor vehicles comprising a radiating section, a casing inclosing the top and sides of the radiating section, a tank below the radiating section, the end portions of said tank having integral upward extensions secured to the sides of said casing and provided with laterally projecting supporting lugs, and means within said tank connecting and stiffening the front and rear walls thereof.

2. A radiator for motor vehicles comprising a radiating section, a casing inclosing the top and sides of the radiating section, a tank below the radiating section, the end portions of said tank having integral upward extensions inclined inwardly and secured to the sides of said casing and provided with laterally projecting supporting lugs, and means within said tank connecting and stiffening the upper portion of the front and rear walls thereof.

3. A radiator for motor vehicles comprising a radiating section, a casing inclosing the top and sides of the radiating section, a tank below the radiating section and secured at its ends to said casing, and a reinforcing member arranged in said tank and secured to the front and rear walls thereof whereby the strength of the tank, as a loaded beam supported at its ends, is increased.

4. A radiator for motor vehicles comprising a radiating section, a casing inclosing the top and sides of the radiating section, a tank below the radiating section and secured at its ends to said casing, and an arched reinforcing member extending from the middle of said tank toward the ends thereof within the tank and secured to the front and rear walls thereof, whereby the strength of the tank, as a loaded beam supported at its ends, is increased.

5. A radiator for motor vehicles comprising a radiating section, a casing inclosing the top and sides of the radiating section, a tank below the radiating section and secured at its ends to said casing, and an arched channel member secured within said tank to the front and rear walls thereof and extending substantially from one end of the tank to the other, whereby the strength of the tank, as a loaded beam supported at its ends, is increased, 6. A radiator for motor vehicles comprising a radiating section, a casing inclosing the top and sides of the radiating section, and a tank below the radiating section, the end portions of said tank having integral upward extensions secured to the sides of said casing and provided with laterally projecting supporting lugs.

7. A radiator for motor vehicles including a tank at the bottom thereof, means at the ends of the tank to support the same and thereby the entire radiator, and means to stiffen the longitudinal vertical sides of the tank whereby the strength of the tank as a loaded beam supported at its ends, is increased.

8. A radiator for motor vehicles including a tank carrying the other parts of the radiator, means at the ends of said tank to support the same, and means to reinforce the tank against deflection as a loaded beam supported at its ends.

In testimony whereof I affix my signature in presence of two witnesses.

HAROLD D. CHURCH.

Witnesses:
J. L. BLAKESLEE,
C. E. BROAD.